(12) United States Patent
Nakano

(10) Patent No.: US 6,522,966 B2
(45) Date of Patent: Feb. 18, 2003

(54) METHOD OF CONTROLLING VEHICLE HYDRAULIC BRAKE SYSTEM

(75) Inventor: Keita Nakano, Itami (JP)

(73) Assignee: Sumitomo (SEI) Brake Systems, Inc., Mie (JP)

( * ) Notice: Subject to any disclaimer, the term of this patent is extended or adjusted under 35 U.S.C. 154(b) by 0 days.

(21) Appl. No.: 09/827,914

(22) Filed: Apr. 9, 2001

(65) Prior Publication Data

US 2002/0022918 A1 Feb. 21, 2002

(30) Foreign Application Priority Data

Apr. 19, 2000 (JP) .......................... 2000-118044

(51) Int. Cl.⁷ ............................ G06F 7/00; B60T 13/18
(52) U.S. Cl. ................... 701/70; 701/78; 303/2; 303/11
(58) Field of Search ...................... 701/70, 71, 78; 303/10, 116.1, 116.2, 11, 2; 188/2 R (56) References Cited

U.S. PATENT DOCUMENTS

| | | | |
|---|---|---|---|
| 5,332,298 A | 7/1994 | Fujioka | 303/20 |
| 5,545,929 A | 8/1996 | Fijioka et al. | 303/166 |
| 5,575,542 A | 11/1996 | Tanaka et al. | 303/125 |
| 5,647,647 A | 7/1997 | Kato et al. | 303/122.09 |

FOREIGN PATENT DOCUMENTS

| | | |
|---|---|---|
| DE | 4112137 | 10/1992 |
| DE | 19753786 | 6/1999 |
| EP | 0734929 | 10/1996 |
| EP | 1020339 | 7/2000 |
| JP | 2590825 | 1/1988 |
| JP | 9-20229 | 1/1997 |

OTHER PUBLICATIONS

English Language Abstract of JP 2590825.
English Language Abstract of JP 9–20229.

*Primary Examiner*—Yonel Beaulieu
(74) *Attorney, Agent, or Firm*—Greenblum & Bernstein, P.L.C.

(57) ABSTRACT

A method of controlling a pump-driven type vehicle hydraulic brake system which can suppress pulsation of brake hydraulic pressure and makes it possible to accurately and quickly apply brake hydraulic pressure is provided. Using an equation between the pressure rising speed of the hydraulic pressure in the master cylinder and the approximate required driving force of the motor, the driving force of the motor is set from the pressure rising speed of the detected hydraulic pressure. The driving force of the motor is controlled to minimize the hydraulic pressure difference between the brake hydraulic pressure increased by the preset driving force and the hydraulic pressure in the master cylinder, thereby bringing the brake hydraulic pressure substantially close to the hydraulic pressure in the master cylinder. Only for the remaining hydraulic pressure difference, the motor driving force is controlled with a small control output to quickly and precisely apply brake hydraulic pressure while suppressing pulsation of the brake hydraulic pressure.

12 Claims, 6 Drawing Sheets

METHOD OF CONTROLLING VEHICLE HYDRAULIC BRAKE SYSTEM

BACKGROUND OF THE INVENTION

This invention relates to a method of controlling a vehicle hydraulic brake system provided with a pump for producing brake hydraulic pressure.

In recent years, in order to realize sophisticated vehicle behavior control and a light brake operation feeling, as described e.g. in patent publication 2590825, a vehicle hydraulic brake system is employed in which a pump as a hydraulic pressure source for producing brake hydraulic pressure is provided and a motor for driving the pump is actuated based on a detection signal of a brake operating force detecting means for detecting the operating force of a brake operating member.

Among such pump-driven type brake systems, there are ones in which a master cylinder for producing hydraulic pressure corresponding to the operating force applied to the brake operating member is in communication with wheel cylinders through an on-off valve by way of a so-called master cylinder passage, and if the pump is not operating normally, the hydraulic pressure in the master cylinder is transmitted as brake hydraulic pressure by opening the on-off valve to provide a failsafe function.

For such pump-driven type brake systems, a method of controlling the driving force for the pump-driving motor with the brake hydraulic pressure corresponding to the brake operating force as detected by the brake operating force detecting means as a target value is often employed. For such controls of the motor driving force, PID control is ordinarily employed.

In the control method of such a pump-driven type vehicle hydraulic brake system, there is a delay in response after the brake operating force has been detected by the brake operating force detecting means until the pump-driving motor is actuated, so that rise of the brake hydraulic pressure is slow. Thus, in the initial period of operation of the brake operating member, a large difference in hydraulic pressure is produced between the control target value of the brake hydraulic pressure and the actual brake hydraulic pressure.

Thus, in the above-described conventional control method, if the control output of the motor driving force is increased corresponding to the hydraulic pressure difference, the brake hydraulic pressure in the wheel cylinders pulsates due to brake fluid discharged from the pump, so that no smooth control is possible. Also, if the control gain is reduced to suppress such a pulsation of the brake hydraulic pressure, a speed at which brake hydraulic pressure follows the target pressure slows down, so that the driver feels a delay in the braking effect. During abrupt braking, it is possible that the braking effect will not appear in time.

An object of this invention is to provide a control method of a pump-driven type vehicle hydraulic brake system which can suppress pulsation of brake hydraulic pressure and makes it possible to accurately and quickly apply brake hydraulic pressure.

SUMMARY OF THE INVENTION

According to this invention, there is provided a method of controlling a vehicle hydraulic brake system comprising a wheel cylinder, a pump for producing brake hydraulic pressure by supplying brake fluid into the wheel cylinder, a motor for driving the pump, a fluid passage for bringing the pump and the wheel cylinder into communication with each other, a brake hydraulic pressure detecting means for detecting the brake hydraulic pressure in the wheel cylinder, a brake operating member, and a brake operating force detecting means for detecting the operating force applied to the brake operating member, and adapted to detect the brake operating force by the brake operating force detecting means and control the driving force of the motor with the brake hydraulic pressure corresponding to the detected brake operating force used as a target value, characterized in that an equation showing the relation between the rising speed of the brake operating force and the driving force of the motor required to cause the brake hydraulic pressure to follow the brake operating force is determined beforehand, and the driving force of the motor is preset from the rising speed of the detected brake operating force by use of the equation, and the driving force of the motor is controlled so as to decrease the hydraulic pressure difference between a target brake hydraulic pressure and the brake hydraulic pressure which is estimated to rise by the preset driving force or the actual brake hydraulic pressure that has been increased by the preset driving force of the motor.

That is to say, by determining an equation showing the relation between the rising speed of the brake operating force and the required driving force of the motor beforehand, setting the driving force of the motor from the rising speed of the detected brake operating force by use of the equation, controlling the driving force of the motor to decrease the hydraulic pressure difference between the estimated value or actual value of the brake hydraulic pressure to bring the brake hydraulic pressure substantially close to the target value with the set driving force, and only for the remaining hydraulic pressure difference, controlling the motor driving force with a small control output, it is possible to quickly and smoothly cause the brake bydraulic pressure to follow the target value.

This control method for the vehicle hydraulic brake system can also be employed for a brake system in which a master cylinder for producing hydraulic pressure corresponding to the operating force applied to the brake operating member is provided, and a master cylinder passage for communicating the master cylinder with the wheel cylinder through an on-off valve is provided to transmit the hydraulic pressure produced in the master cylinder by selectively opening and closing the on-off valve in the master cylinder passage.

By adding the value of the brake hydraulic pressure itself to the equation between the rising speed of the brake operating force and the driving force of the motor as a parameter, since the required driving force of the motor slightly changes with the level of the brake hydraulic pressure itself, it is possible to increase the accuracy of control for bringing the brake hydraulic pressure close to the target value with the set driving force.

If a master cylinder for producing hydraulic pressure corresponding to the operating force applied to the brake operating member is provided, means for detecting the hydraulic pressure produced in the master cylinder is provided, and the hydraulic pressure in the master cylinder detected by the master cylinder hydraulic pressure detecting means can be used as a brake operating force in the control.

Other features and objects of the present invention will become apparent from the following description made with reference to the accompanying drawings, in which:

DETAILED DESCRIPTION OF THE PREFERRED EMBODIMENT

Figure 1:
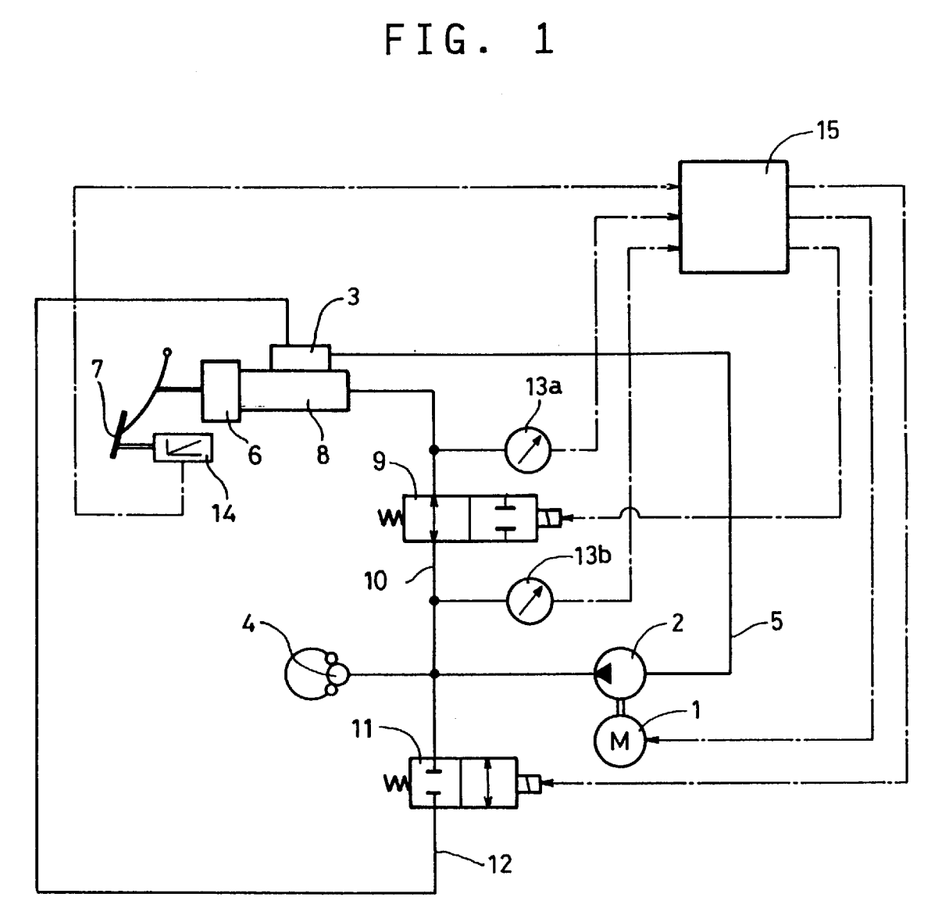
FIG. 1 is a circuit diagram showing a brake system to which is applied a control method of a first embodiment;_

Hereinbelow, with reference to the drawings, the embodiments of this invention are described. FIG. 1 shows a vehicle hydraulic brake system to which is applied the control method of the first embodiment. In this brake system, a pump 2 as a hydraulic pressure source driven by a motor 1 is mounted in a fluid passage 5 through which a reservoir tank 3 and a wheel cylinder 4 communicate with each other. A master cylinder 8 is coupled to a brake pedal 7 as a brake operating member through a booster 6. The hydraulic pressure produced in the master cylinder 8 is detected as a brake operating force by a below-described pressure sensor 13a.

Also, the master cylinder 8 and the wheel cylinder 4 communicate with each other through a solenoid valve 9, which is an on-off valve, by way of a master cylinder passage 10. Between the wheel cylinder 4 and the reservoir tank 3, a relief passage 12 for brake fluid is also provided in which is mounted a solenoid valve 11.

In the master cylinder passage 10, pressure sensors 13a, 13b for detecting the hydraulic pressures in the master cylinder 8 and the brake hydraulic pressure in the wheel cylinder 4, respectively, are mounted. To the brake pedal 7, a stroke sensor 14 for detecting its depressing amount is mounted. Detection signals from these sensors 13a, 13b and 14 are inputted in a controller 15. Based on these detection signals, actuations of the motor 1 and solenoid valves 9 and 11 are controlled.

In a normal state, the solenoid valve 9 is closed, so that the master cylinder 8 and the wheel cylinder 4 are shut off from each other. When the controller 15 detects depressing of the brake pedal 7 by the stroke sensor 14, it closes the solenoid valve 11 in the relief passage 12, activates the motor 1 simultaneously, and controls the driving force of the motor 1 in the below-mentioned manner to supply brake fluid in the reservoir tank 3 to the wheel cylinder 4 by the pump 2 to generate brake hydraulic pressure.

But if the amount of brake fluid supplied by the pump 2 becomes insufficient for some reason and the controller 15 judges that the brake hydraulic pressure detected by the pressure sensor 13b is insufficient, the controller opens the solenoid valve 9 in the master cylinder passage 10 to transmit hydraulic pressure in the master cylinder 8 to the wheel cylinder 4 to produce a sufficient brake hydraulic pressure.

In either of the above cases, when the controller 15 detects release of the brake pedal 7, it opens the solenoid valve 11 in the relief passage 12 to release the braking force and return brake fluid supplied to the wheel cylinder 4 to the reservoir tank 3.

Hereinbelow, the control method of the first embodiment is described with reference to two Examples. In this control method, the driving force W of the motor 1 is controlled by the controller 15, and an estimate control and a feedback (FB) control are combined.

Example 1

Figure 2:
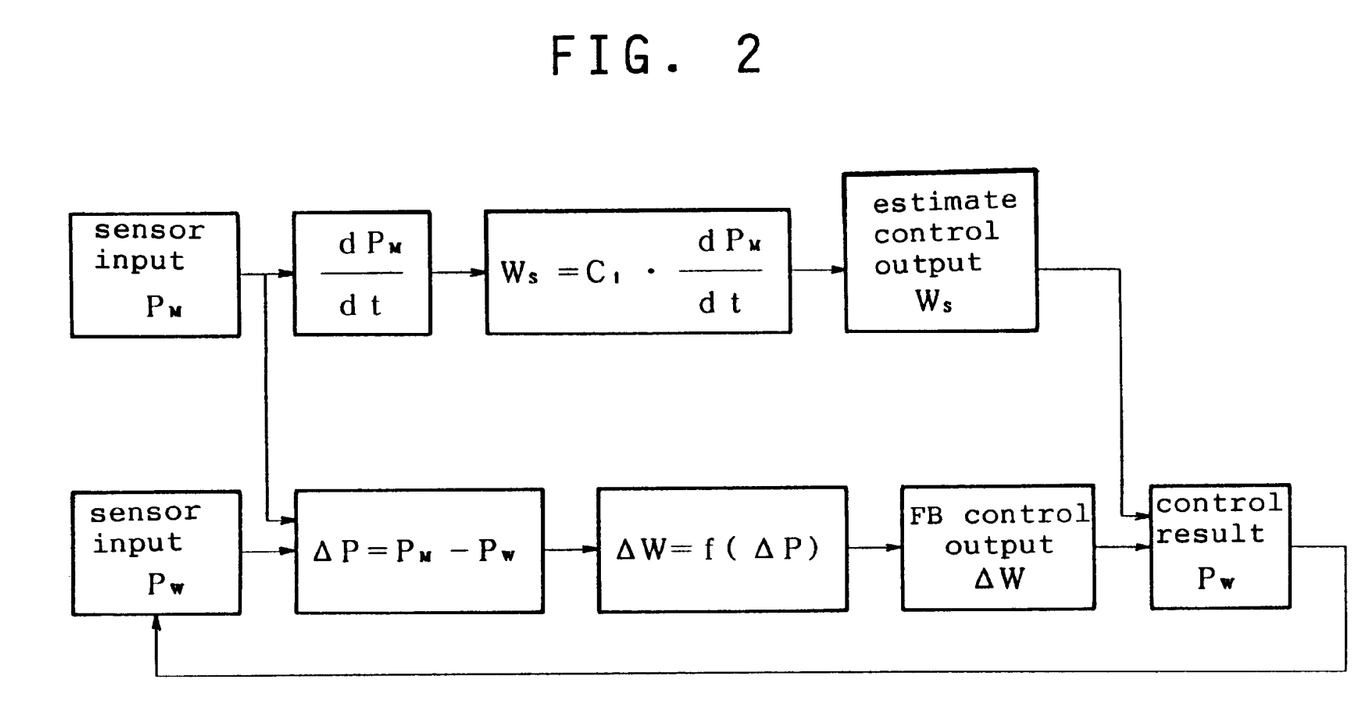
FIG. 2 is a flowchart showing a control method of Example 1 for the brake system of FIG. 1.

FIG. 2 shows a flowchart of the control method of Example 1. First, in the estimate control, the hydraulic pressure $P_M$ in the master cylinder 8 as the brake operating force detected by the pressure sensor 13a is entered in the controller 15. The latter determines the pressure rise speed $dP_M/dt$ of the hydraulic pressure $P_M$ from this input signal, and calculates the driving force $W_S$ of the motor by the following equation:

$$W_S = C_1 \cdot (dP_M/dt) \ldots \quad (1)$$

Equation (1) is one formulated by experientially finding the relation between the pressure rise speed of the hydraulic pressure $P_M$ in the master cylinder 8, which reflects the degree of requirement for the braking force by the driver, and the driving force W of the motor necessary to produce the required braking force. $C_1$ is a proportional constant. That is to say, by actuating the motor with the driving force $W_S$ calculated by use of the equation (1), the brake hydraulic pressure $P_W$ in the wheel cylinder 4 as control results is increased to a value close to the target hydraulic pressure $P_M$ in the master cylinder 8. In this Example, the number of times of control in the estimate control was one time only.

Next, in the feedback control, the hydraulic pressure $P_M$ in the master cylinder 8 as detected by the pressure sensor 13a and the brake hydraulic pressure $P_W$ in the wheel cylinder 4 as detected by the pressure sensor 13b are entered moment by moment into the controller 15. The latter calculates the hydraulic pressure difference $\Delta P$ between the hydraulic pressure $P_M$ and the brake hydraulic pressure $P_W$, and calculates the motor driving force increment $\Delta W$ for the calculated hydraulic pressure difference $\Delta P$ with a gain function f of PID control, and outputs it. The brake hydraulic pressure $P_W$ as the control results of the estimate control and feedback control is fed back into the controller 15 by the pressure sensor 13b to continue the feedback control.

Figure 3A:
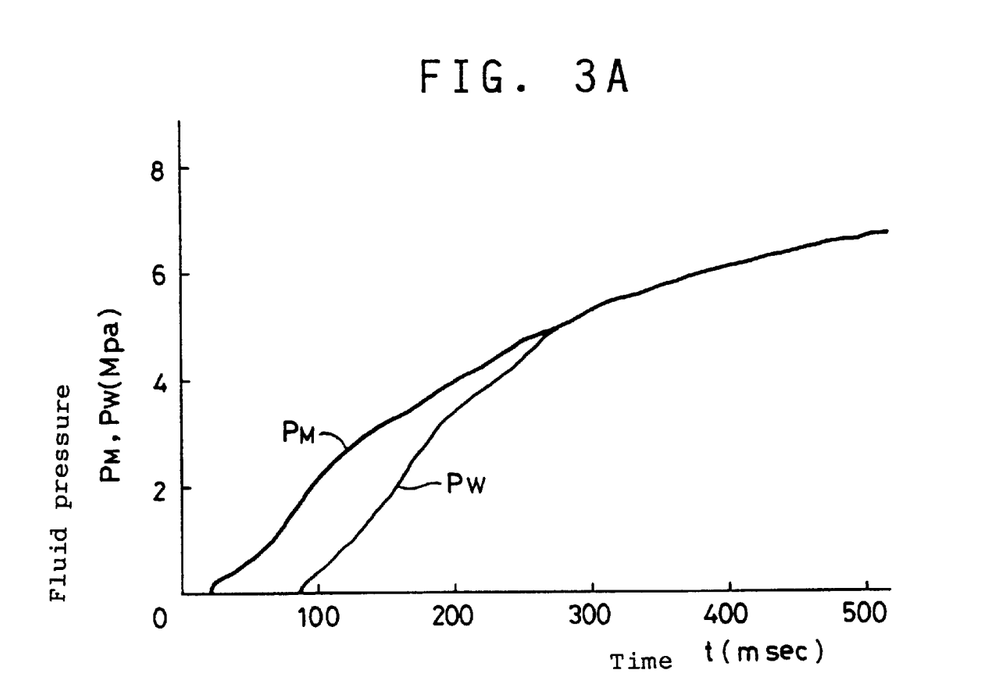
FIG. 3A is a graph showing control results of Example 1.
Figure 3B:
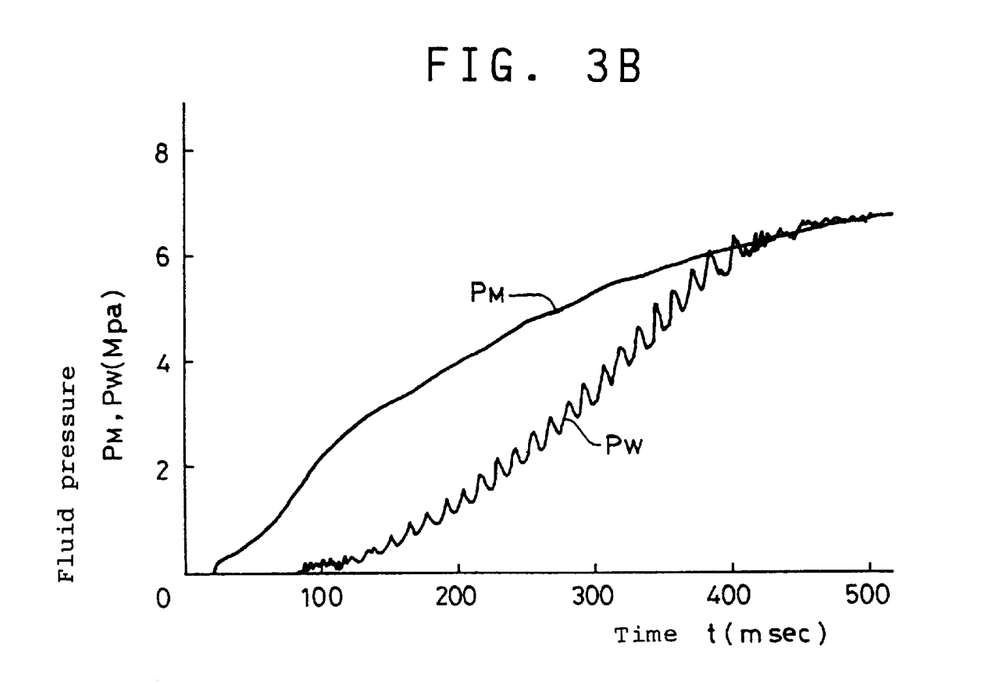
FIG. 3B is a graph showing control results of Comparative Example.

FIG. 3A shows results in which the control method of Example 1, which is a combination of the estimate control and feedback control, is carried out in the brake system shown in FIG. 1 and FIG. 3B shows the results of the conventional control method in which only the feedback control by the PID control is performed.

In the control method of Example 1, in which the estimate control is also used, compared with the conventional control method, the rising speed of the brake hydraulic pressure $P_W$ was markedly high, and smoothly followed the hydraulic pressure $P_M$ in the master cylinder 8 as the target. On the other hand, in the conventional control method, not only was the rising speed of the brake hydraulic pressure $P_W$ slow, but due to a large control output to the pump 2, the brake hydraulic pressure $P_W$ pulsated, so that smooth control was not possible.

Example 2

Figure 4:
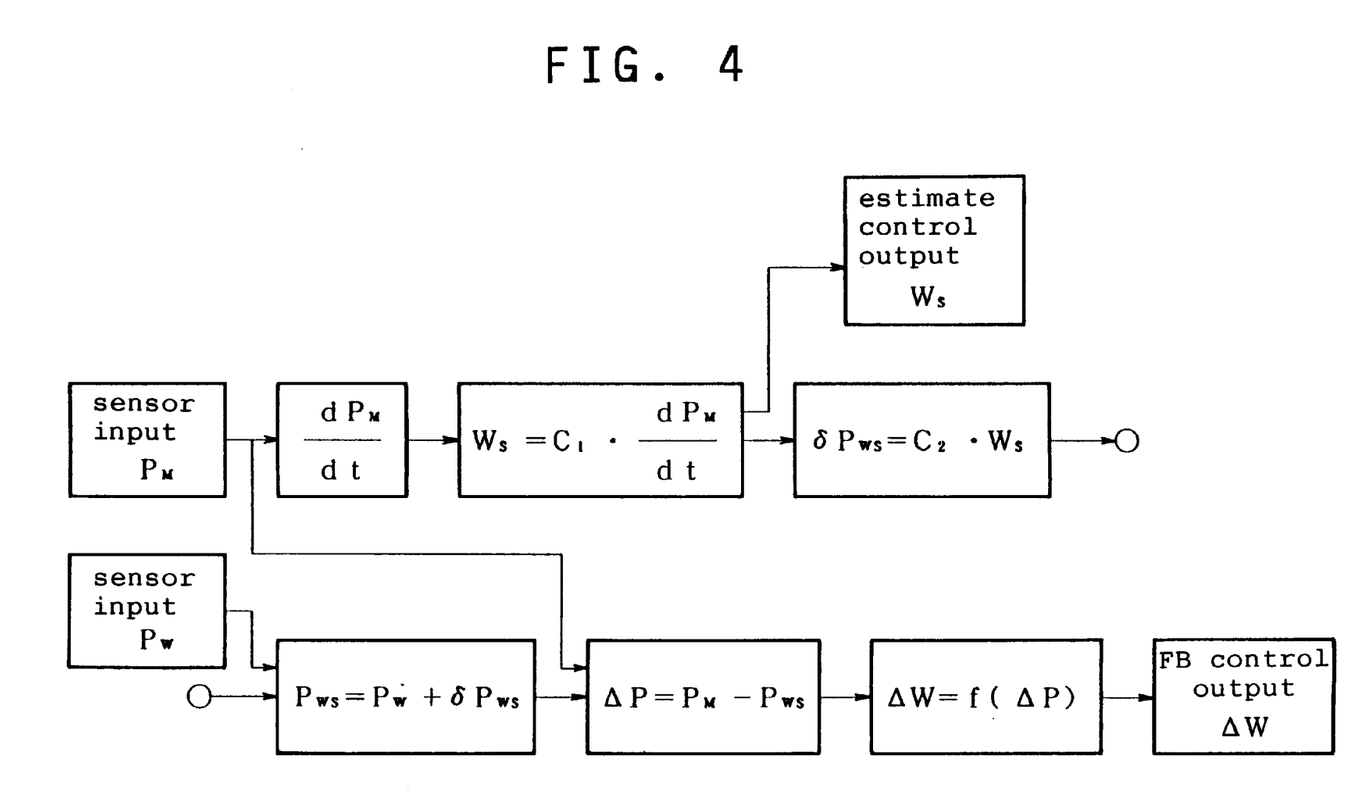
FIG. 4 is a flowchart showing a control method of Example 2 for the brake system of FIG. 1.

FIG. 4 shows a flowchart of the control method of Example 2. In this control method, the number of times of control in the estimate control was plural, and the proportional constant $C_1$ in the equation (1) between the pressure rise speed $dP_M/dt$ of the hydraulic pressure $P_M$ in the master cylinder 8 and the driving force $W_S$ of the motor was made as a function g of the brake hydraulic pressure $P_W$ as shown in the following equation. The control period in the estimate control was 10 times that in the feedback control.

$$C_1 = g(P_W) \ldots \quad (2)$$

For the feedback control, the input of the brake hydraulic pressure $P_W$ from the pressure sensor 13$b$ was corrected with the estimated rising amount $\delta P_{WS}$ of the brake hydraulic pressure $P_W$ by the preset motor driving force $W_S$ as the output of the estimate control as shown below.

For the driving force $W_S$ calculated by use of equation (1), the estimated rising amount $\delta P_{WS}$ of the brake hydraulic pressure $P_W$ is calculated by the following equation:

$$\delta P_{WS} = C_2 \cdot W_S \ldots \quad (3)$$

Equation (3) is determined from the relation between the driving force W of the motor 1 and the delivery speed of the pump 2 and can be obtained beforehand by experiments or calculation. $C_2$ is a proportional constant.

Next, the estimated rising amount $\delta P_{WS}$ calculated in equation (3) is added to the input value of the brake hydraulic pressure $P_W$ from the pressure sensor 13$b$ to determine the estimated brake hydraulic pressure $P_{WS}$, which is an expected pressure rise by the estimate control, and feedback control is carried out for the hydraulic pressure difference $\Delta P$ between the input value of the hydraulic pressure $P_M$ in the master cylinder 8 from the pressure sensor 13$a$ and the estimated brake hydraulic pressure $P_{WS}$. Other procedures are the same as in Example 1.

At timings at which no estimate control is carried out, since the driving force $W_S$ is not outputted, the estimated rising amount $\delta P_{WS}$ is zero. Thus, the feedback control at these timings is substantially the same as in Example 1, and feedback control is carried out for the hydraulic pressure difference $\Delta P$ between the hydraulic pressure $P_M$ as inputted and the brake hydraulic pressure $P_W$. While the control results are omitted, as in Example 1, it was possible to cause the brake hydraulic pressure $P_W$ to quickly and smoothly follow the hydraulic pressure $P_M$ in the master cylinder 8.

Figure 5:
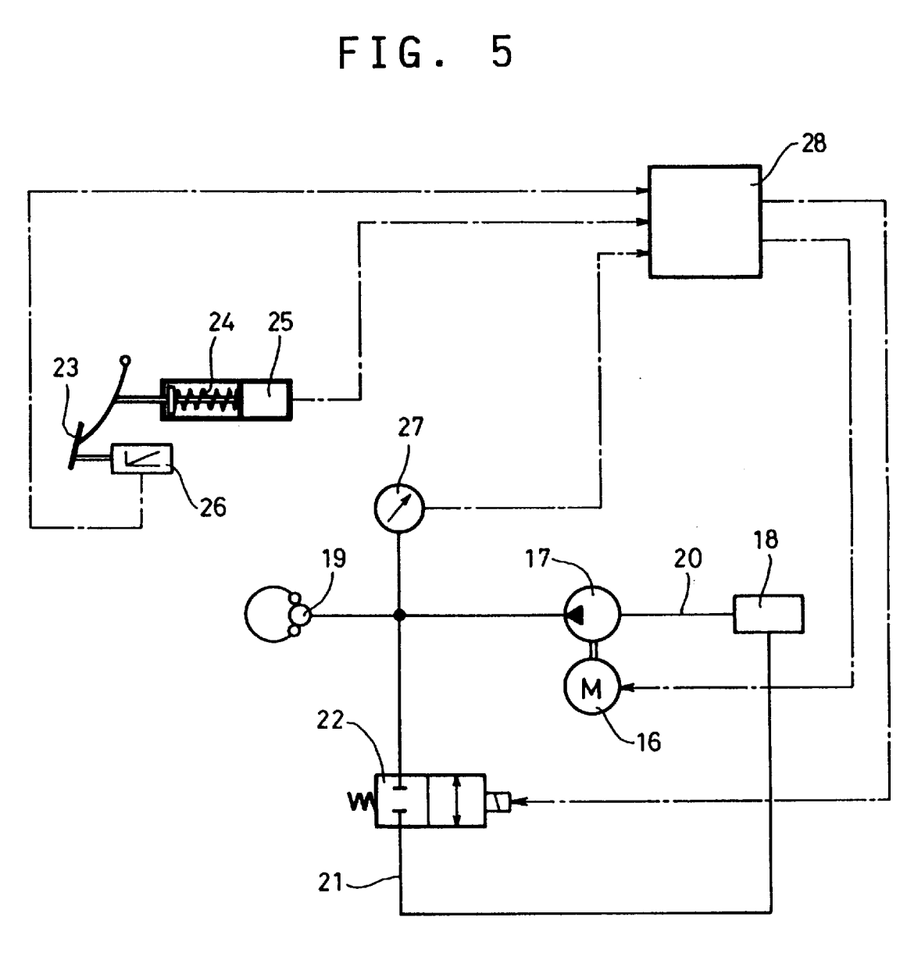
FIG. 5 is a circuit diagram showing a brake system to which is applied a control method of the second embodiment.

FIG. 5 shows a vehicle hydraulic brake system to which the control method of the second embodiment has been applied. With this brake system, a pump 17 as a hydraulic pressure source driven by a motor 16 is provided in a fluid passage 20 through which a reservoir tank 18 and a wheel cylinder 19 communicate, and a solenoid valve 22 is mounted in a relief passage 21 for returning brake fluid from the wheel cylinder 19 to the reservoir tank 18 to produce brake hydraulic pressure with the pump 17 alone.

To a brake pedal 23 as a brake operating member, a spring 24 for producing a depressing force F is coupled, and a load sensor 25 for detecting the depressing force as the brake operating force and a stroke sensor 26 for detecting the depressing amount are mounted. Also, in the fluid passage 20, a pressure sensor 27 for detecting the brake hydraulic pressure in the wheel cylinder 19 is also mounted. Detection signals from the sensor 25, 26, 27 are entered into a controller 28, and based on these detection signals, operations of the motor 16 and the solenoid valve 22 are controlled.

Figure 6:
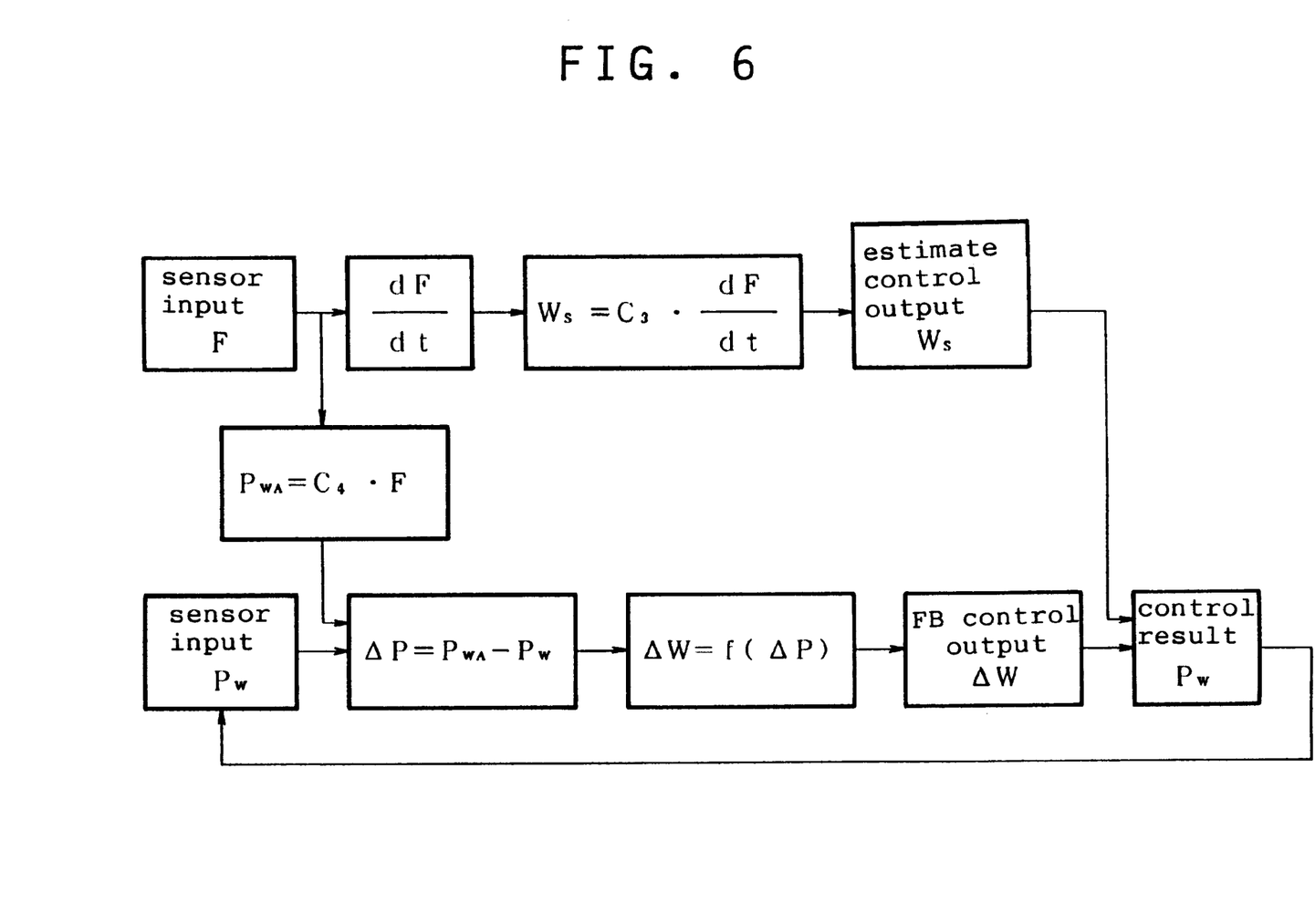
FIG. 6 is a flowchart showing a control method of the brake system of FIG. 5.

FIG. 6 shows a flowchart of the control method of the second embodiment. In this control method, too, the estimate control and the feedback control are combined, and it differs from Example 1 of the first embodiment in that as an input signal of the brake operating force, instead of the master cylinder hydraulic pressure $P_M$, the pedal depressing force F detected by the load sensor 25 is used.

That is, in the estimate control, the controller 28 determines the rising speed dF/dt of the pedal depressing force F from the input signal of the load sensor 25, and calculates the driving force $W_S$ of the motor by use of the following equation:

$$W_S = C_3 \cdot (dF/dt) \ldots \quad (4)$$

Equation (4), too, is formulated experientially from the relation between the rising speed dF/dt of the pedal depressing force F and the driving force W of the motor necessary to produce the required braking force. $C_3$ is a proportional constant.

On the other hand, in the feedback control, since the pedal depressing force F cannot be directly compared with the brake hydraulic pressure $P_W$, the pedal depressing force F is converted to the brake hydraulic pressure $P_{WA}$ as a target by use of the following equation: $C_4$ is a proportional constant.

$$P_{WA} = C_4 \cdot F$$

The controller 28 calculates the hydraulic pressure difference $\Delta P$ between the target brake hydraulic pressure $P_{WA}$ and the actual brake hydraulic pressure $P_W$ as detected by the pressure sensor 27, and as in Example 1, computes the increment $\Delta W$ of the driving force of the motor for the hydraulic pressure difference $\Delta P$ with the gain function f of the PID control and outputs it.

While these control results are not indicated, to the rise of the brake depressing force F corresponding to the master cylinder hydraulic pressure $P_M$ in the graph of FIG. 3A, the brake hydraulic pressure $P_W$ followed quickly and smoothly.

As described above, in the control method for the vehicle hydraulic brake system of this invention, the equation showing the relation between the rising speed of the brake operating force and the approximate required motor driving force is determined beforehand, and, using the equation, the motor driving force is preset from the rising speed of the detected brake operating force. By controlling the motor driving force so as to decrease the hydraulic pressure difference between the estimated value or actual value of the brake hydraulic pressure, which rises by the motor driving force, the brake hydraulic pressure is brought close to the target value with the preset motor driving force, and only for the remaining hydraulic pressure difference, the motor driving force is controlled with a small control output. Thus, it is possible to quickly and reliably apply brakes while suppressing pulsation of the brake hydraulic pressure.

What is claimed is:

1. A method of controlling a vehicle hydraulic brake system including a wheel cylinder, a pump for producing brake hydraulic pressure by supplying brake fluid to said wheel cylinder, a motor for driving said pump, a fluid passage for bringing said pump and said wheel cylinder into communication with each other, a brake hydraulic pressure detector that detects brake hydraulic pressure in said wheel cylinder, a brake operating member, a brake operating force detector that detects brake operating force applied to said brake operating member, and a controller that controls the motor driving force by use of a target brake hydraulic pressure corresponding to the detected brake operating force, said method comprising:

preparing an equation representing the relation between a rising speed of the brake operating force and a motor driving force required to cause the brake hydraulic pressure to follow the rising speed of the brake operating force;

determining the rising speed of the brake operating force detected by said brake operating force detector;

setting the motor driving force required to cause the brake hydraulic pressure to follow the rising speed of the brake operating force thus determined, by use of said prepared equation;

determining the hydraulic pressure difference between the target brake hydraulic pressure and a brake hydraulic pressure which is estimated from the set motor driving force;

determining an incremental motor driving force value that will offset the determined hydraulic pressure difference;

adding the incremental motor driving force value to the set motor driving force to obtain a sum; and controlling the motor driving force by use of the sum.

2. A method of controlling a vehicle hydraulic brake system including a wheel cylinder, a pump for producing brake hydraulic pressure by supplying brake fluid to said wheel cylinder, a motor for driving said pump, a fluid passage for bringing said pump and said wheel cylinder into communication with each other, a brake hydraulic pressure detector that detects brake hydraulic pressure in said wheel cylinder, a brake operating member, a brake operating force detector that detects brake operating force applied to said brake operating member, and a controller that controls the motor driving force by use of a target brake hydraulic pressure corresponding to the detected brake operating force, said method comprising:

preparing an equation representing the relation between a rising speed of the brake operating force and the motor driving force required to cause the brake hydraulic pressure to follow the rising speed of the brake operating force;

determining the rising speed of the brake operating force detected by said brake operating force detector;

setting the motor driving force required to cause the brake hydraulic pressure to follow the rising speed of the brake operating force thus determined, by use of said prepared equation;

determining the hydraulic pressure difference between the target brake hydraulic pressure and the actual brake hydraulic pressure that has been increased by said motor driving force;

determining an incremental motor driving force value that will offset the determined hydraulic pressure difference;

adding the incremental motor driving force value to the set motor driving force to obtain a sum; and controlling the motor driving force by use of the sum.

3. The method of controlling a vehicle hydraulic brake system as claimed in claim 1, further comprising:

providing a master cylinder for producing hydraulic pressure corresponding to the operating force applied to said brake operating member; and providing a master cylinder passage for bringing said master cylinder and said wheel cylinder into communication with each other through an on-off valve to transmit the hydraulic pressure produced in said master cylinder by selectively opening and closing said on-off valve in said master cylinder passage.

4. The method of controlling a vehicle hydraulic brake system as claimed in claim 1, wherein the equation representing the relation between the rising speed of the brake operating force and the required driving force of the motor includes the value of the brake hydraulic pressure itself as a parameter.

5. The method of controlling a vehicle hydraulic system as claimed in claim 3, further comprising:

providing a master cylinder hydraulic pressure detector that detects the hydraulic pressure produced in said master cylinder; and using the hydraulic pressure in said master cylinder as detected by said master cylinder hydraulic pressure detector as the brake operating force in said control.

6. The method of controlling a vehicle hydraulic brake system as claimed in claim 3, wherein the equation representing the relation between the rising speed of the brake operating force and the required driving force of the motor includes the value of the brake hydraulic pressure itself as a parameter.

7. The method of controlling a vehicle hydraulic brake system as claimed in claim 5, wherein the equation representing the relation between the rising speed of the brake operating force and the required driving force of the motor includes the value of the brake hydraulic pressure itself as a parameter.

8. The method of controlling a vehicle hydraulic brake system as claimed in claim 2, further comprising:

providing a master cylinder for producing hydraulic pressure corresponding to the operating force applied to said brake operating member; and providing a master cylinder passage for bringing said master cylinder and said wheel cylinder into communication with each other through an on-off valve to transmit the hydraulic pressure produced in said master cylinder by selectively opening and closing said on-off valve in said master cylinder passage.

9. The method of controlling a vehicle hydraulic brake system as claimed in claim 2, wherein the equation representing the relation between the rising speed of the brake operating force and the required driving force of the motor includes the value of the brake hydraulic pressure itself as a parameter.

10. The method of controlling a vehicle hydraulic system as claimed in claim 8, further comprising:

providing a master cylinder hydraulic pressure detector that detects the hydraulic pressure produced in said master cylinder; and using the hydraulic pressure in said master cylinder as detected by said master cylinder hydraulic pressure detector as the brake operating force in said control.

11. The method of controlling a vehicle hydraulic brake system as claimed in claim 8, wherein the equation representing the relation between the rising speed of the brake operating force and the required driving force of the motor includes the value of the brake hydraulic pressure itself as a parameter.

12. The method of controlling a vehicle hydraulic brake system as claimed in claim 10, wherein the equation representing the relation between the rising speed of the brake operating force and the required driving force of the motor includes the value of the brake hydraulic pressure itself as a parameter.

* * * * *